(12) United States Patent
Hirai et al.

(10) Patent No.: US 6,222,622 B1
(45) Date of Patent: Apr. 24, 2001

(54) PHOTOMETERING APPARATUS FOR A CAMERA

(75) Inventors: Isamu Hirai, Tokyo; Tadahisa Ohkura, Saitama, both of (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/200,875

(22) Filed: Nov. 27, 1998

(30) Foreign Application Priority Data

Nov. 26, 1997 (JP) .................................................. 9-325014

(51) Int. Cl.$^7$ ........................................................ G01J 1/00
(52) U.S. Cl. ............................................................. 356/213
(58) Field of Search .................................... 356/213–235; 396/121–152, 213–240, 529–543, 440

(56) References Cited

U.S. PATENT DOCUMENTS 4,977,424 * 12/1990 Mukai et al. .
5,012,268    4/1991 Hirai .
5,289,225 *  2/1994 Hirai .

* cited by examiner

Primary Examiner—Frank G. Font
Assistant Examiner—Tu T. Nguyen
(74) Attorney, Agent, or Firm—Greenblum & Bernstein P.L.C.

(57) ABSTRACT

A photometering apparatus for a camera including a photometering sensor which receives object light transmitted through a focusing plate and measures the brightness of an object; and a focusing plate holding device which detachably holds the focusing plate includes: a discrimination device which discriminates the type of focusing plate held by the focusing plate holding device, and a controller which selects a photometering algorithm and/or a parameter corresponding to the discriminated focusing plate from a plurality of photometering algorithms and parameters.

11 Claims, 15 Drawing Sheets

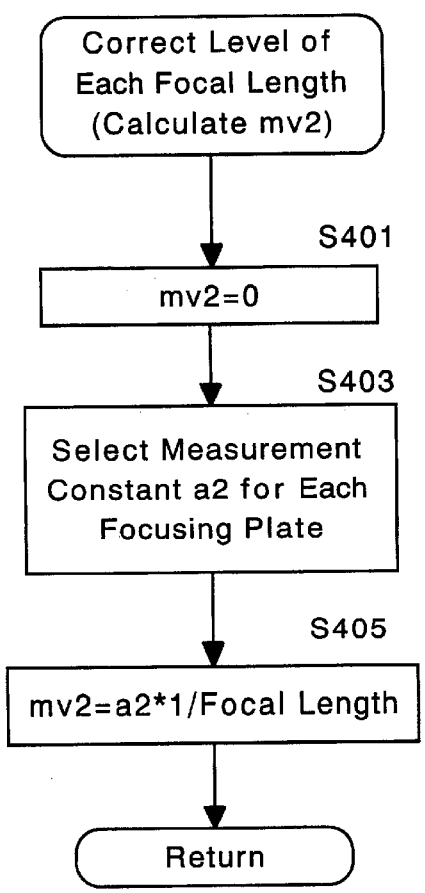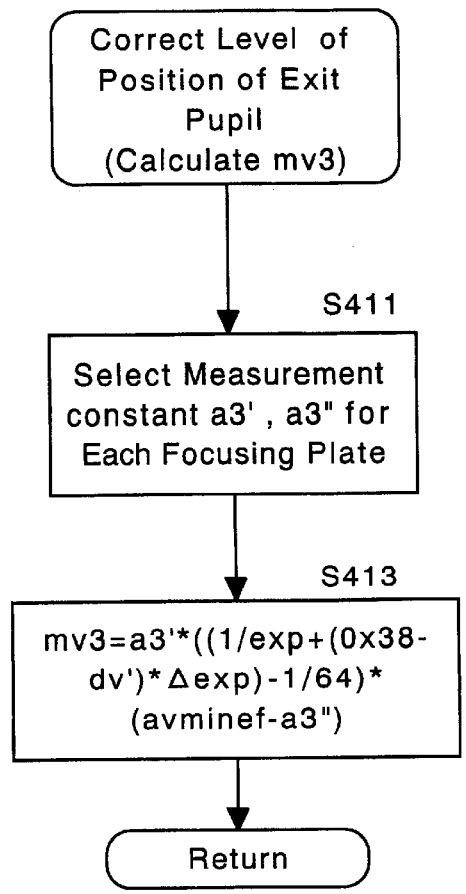

PHOTOMETERING APPARATUS FOR A CAMERA

BACKGROUND OF THE INVENTION

1. Field of the Invention

The present invention relates to a photometering apparatus for a camera having an interchangeable focusing plate.

2. Description of the Related Art

In general, a single lens reflex camera is provided with a view finder in which light carrying an object image formed by a photographing lens is converged onto a focusing plate (focusing screen) which is located in a position optically equivalent to a film surface, whereby the object image formed on the focusing plate can be enlarged and viewed as an erect image through a magnifier and an image erection system (pentagonal prism). To detect the brightness of the object, a photometering device (photometering sensor) is provided in the vicinity of the magnifier; the object image formed on the focusing plate is re-formed on a light receiving surface of the photometering sensor to measure the object brightness in accordance with the output of the photometering sensor corresponding to the object.

There are known various focusing plates including those which are provided on the center portion thereof with a split image or a microprism, or provided on the entire surface thereof with a mat.

In a camera in which a replaceable screen on which a desired focusing plate can be optionally mounted, the state, or the quantity of the object image light rays transmitted through the focusing plate varies depending on the characteristics of the mounted focusing plate. Therefore, for different focusing plates, the state, or quantity of the object light incident upon the photometering sensor is different, thus resulting in an unreliable measurement of the object brightness. This is shown in FIGS. 16 and 17 by way of example.

FIG. 16 shows an example in which, in a spot beam photometering operation, an exposure error caused by the different characteristics of the focusing plates varies as the minimum diaphragm value (open aperture) Avmin of the photographing lens changes. FIG. 17 shows an example in which an exposure error caused by the different characteristics of the focusing plates varies as the position of the exit pupil changes.

SUMMARY OF THE INVENTION

The object of the present invention is to provide a photometering apparatus for a camera having an interchangeable focusing plate, in which the measured object brightness can be corrected in accordance with the characteristics of the selected focusing plate.

To achieve the object mentioned above, according to the present invention, there is provided a photometering apparatus for a camera including a photometering sensor which receives object light transmitted through a focusing plate and measures the brightness of an object, and a focusing plate holding device which detachably holds the focusing plate including: a discrimination device for discriminating the type of focusing plate held by the focusing plate holding device; and a control device for selecting at least one attribute from a plurality of photometering algorithms and parameters corresponding to the focusing plate discriminated by the discriminating device. The selected attribute can be an algorithm, a parameter, or a combination of both.

Preferably, the control device corrects a photometering correction value corresponding to the focusing plate discriminated by the discriminating device.

Preferably, the control device selects a photometering mode corresponding to the focusing plate discriminated by the discriminating device.

Preferably, the control device modifies a split-photometering algorithm which corresponds to the focusing plate discriminated by the discriminating device.

Preferably, the focusing plate is provided with a discrimination member which is adapted to discriminate the type of focusing plate. The discriminating device detects the discrimination member to thereby discriminate the type of focusing plate.

Preferably, the type of focusing plate is either: a mat type, a split image type, a microprism type, a whole surface mat type, or a Fresnel lens type.

Preferably, the correction of the photometering correction value includes a correction of the uniform level of the measured brightness.

Preferably, the correction of the photometering correction value includes a correction of the output level, of the photometering sensor which can be varied in accordance with an open diaphragm value.

Preferably, the correction of the photometering correction value includes a correction of the output level of the photometering sensor in accordance with the position of an exit pupil.

Preferably, the selection of the photometering mode is carried out by switching between a split-photometering operation and a center-weighted photometering operation.

Preferably, the selection of the photometering mode is carried out by switching between a spot-beam photometering operation and a center-weighted photometering operation.

Preferably, the selection of the photometering mode is carried out by the modification of a calculation expression for a center-weighted photometering operation.

Preferably, the modification of the split-photometering algorithm is carried out by modifying the weighting value of the split photometering areas.

Preferably, the parameters corresponding to the focusing plate include: the photometering error level, the minimum diaphragm value, and the exit pupil.

The present disclosure relates to subject matter contained in Japanese Patent Application No. 09-325014 (filed on Nov. 26, 1997) which is expressly incorporated herein by reference in its entirety.

BRIEF DESCRIPTION OF THE DRAWINGS

The invention will be described below in detail with reference to the accompanying drawings in which:

FIG. 11 is a flow chart of a correcting operation for the focal length correction level in a single lens reflex camera to which the present invention is applied, by way of example;

FIG. 12 is a flow chart of a correcting operation for the exit pupil position level in a single lens reflex camera to which the present invention is applied, by way of example;

DESCRIPTION OF THE PREFERRED EMBODIMENT

Figure 1:
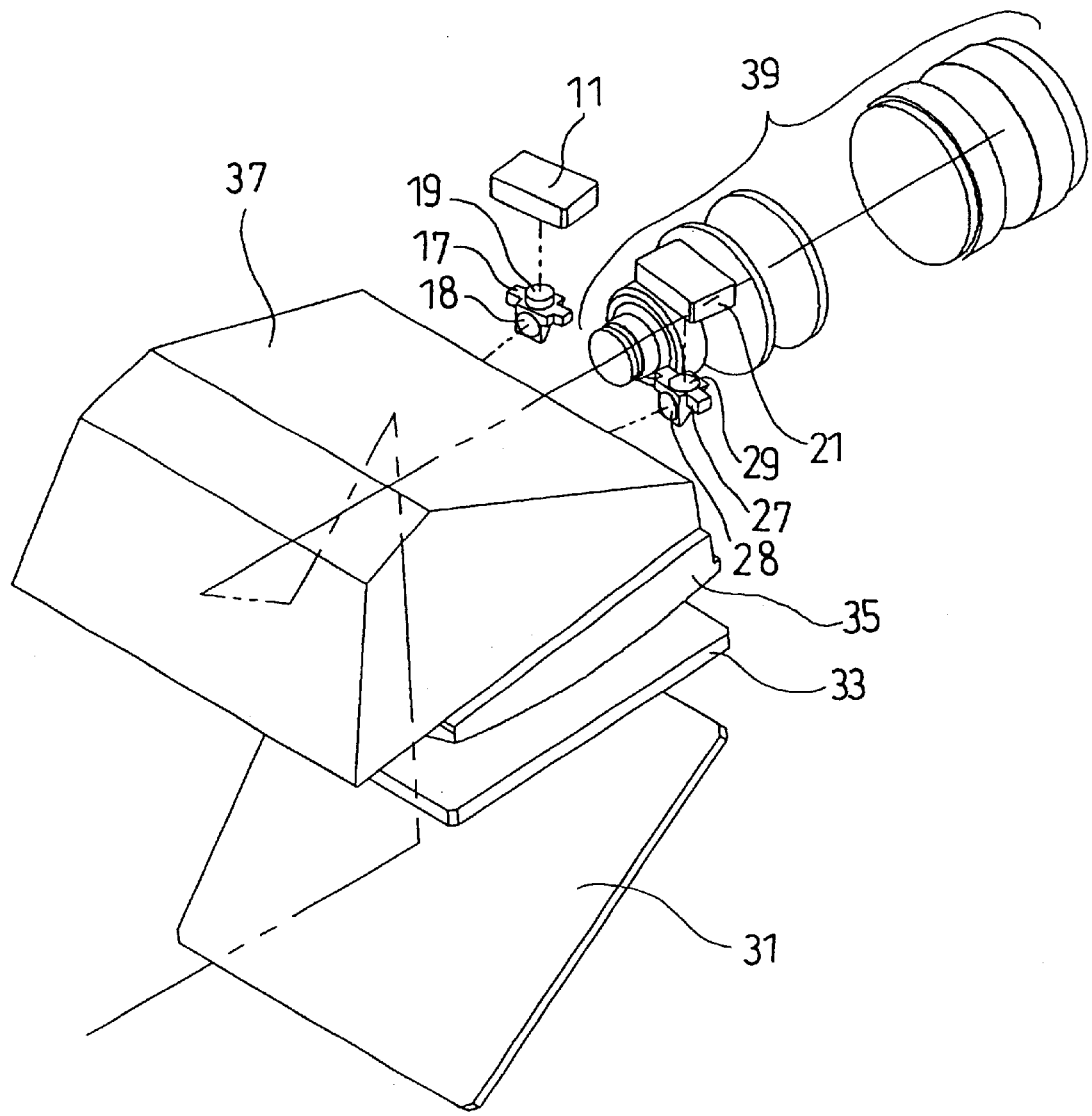
FIG. 1 is an exploded perspective view of a photometering apparatus applied to a single lens reflex camera, according to an embodiment of the present invention.

FIG. 1 shows an exploded perspective view of a photometering apparatus applied to a single lens reflex camera according to the present invention, and the surroundings thereof. Light which carries an object image incident through a photographing lens (not shown) is reflected by a main mirror 31; is transmitted through a focusing plate (screen) 33, which is located at a position optically equivalent to the film surface, and a condenser lens 35; and is made incident on a trapezoidal prism 37 which forms an image erection optical system which erects an inverted object image. A large part of the object light reflected in and emitted from the trapezoidal prism 37, is transmitted through a finder magnifier (eyepiece) 39, and is received by the user's (photographer's) eye.

First and second split photodetectors 11 and 21 (photometering sensors), each of which constitute a photometering system, are provided on opposite sides of the finder magnifier 39. The split photodetectors 11 and 21 are provided with photometering systems 17 and 27, respectively, through which the object light emitted from the trapezoidal prism 37 is made incident on the light receiving surfaces of the photodetectors 11 and 21 to form object images. The photometering systems 17 and 27 are each composed of: first photometering lens 18 and 28, respectively; a mirror (not shown) which deflects the light path by 90° in the upward direction of the camera body, and second photometering lens 19 and 29, respectively, as an image forming lens; in this order from the trapezoidal prism (37) side.

Figure 2:
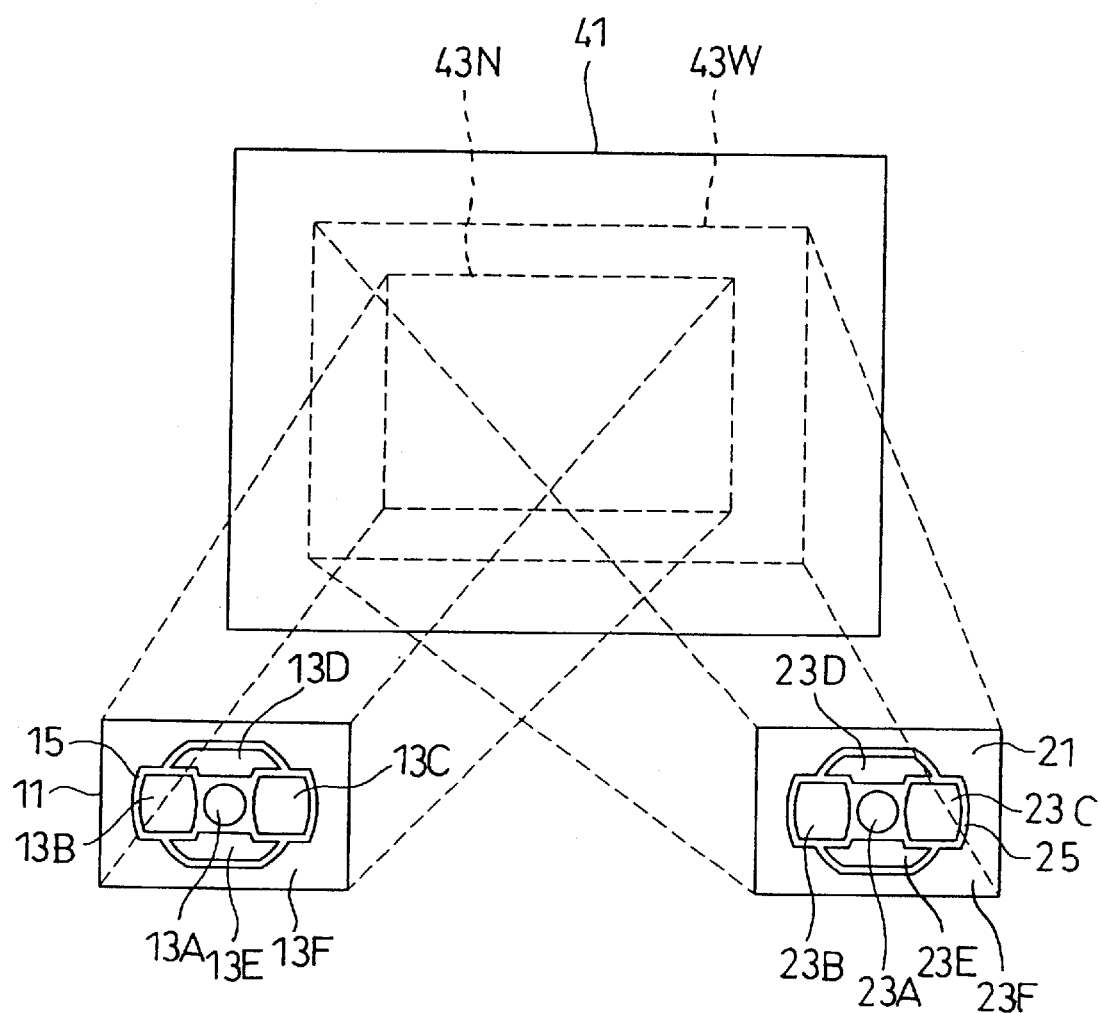
FIG. 2 is an explanatory view of a relationship between detection areas of a pair of split photodetectors and an image surface, in a photometering apparatus shown in FIG. 1.

The split photodetectors 11 and 21 are the same and have the same split detection area pattern (see FIG. 2). The light receiving surfaces of the split photodetectors 11 and 21 are each provided with six split detection areas which are separated by an insensitive area. Namely, the first split photodetector 11 includes a central detection area 13A, a pair of right and left detection areas 13B and 13C on opposite sides of the central detection area 13A, a pair of upper and lower detection areas 13D and 13E on opposite sides of the central detection area 13A, a peripheral detection area 13F, and an insensitive area 15 which separates the detection areas 13A through 13F. Likewise, the second split photodetector 21 includes split detection areas 23A through 23F and an insensitive area 25, identical in shape to the detection areas 13A through 13F and the insensitive area 15, respectively.

FIG. 2 shows the relationship between the picture surface (whole object area) 41 of the camera and the detection areas 43N and 43W corresponding to the object areas formed on the light receiving surfaces of the split photodetectors 11 and 21. As can be seen in FIG. 2, the object image within the smaller detection area 43N of the picture surface 41 is formed on the first photodetector 11, and the object image within the detection area 43W which is larger than the detection area 43N is formed on the second photodetector 21. The larger detection area 43W is projected onto the second photodetector 21 at a magnification less than that of the detection area 43N projected onto the first photodetector 11. Namely, the object images are formed on the first photodetector 11 and the second photodetector 21 at a high magnification and a low magnification, respectively. Accordingly, the magnification of the photometering system 17 is higher than the magnification of the photometering system 27; or the focal length of the photometering system 17 is longer than the focal length of the photometering system 27. In other words, the first split photodetector 11 is a narrow field sensor and the second split photodetector 21 is a wide field sensor.

Figure 3:
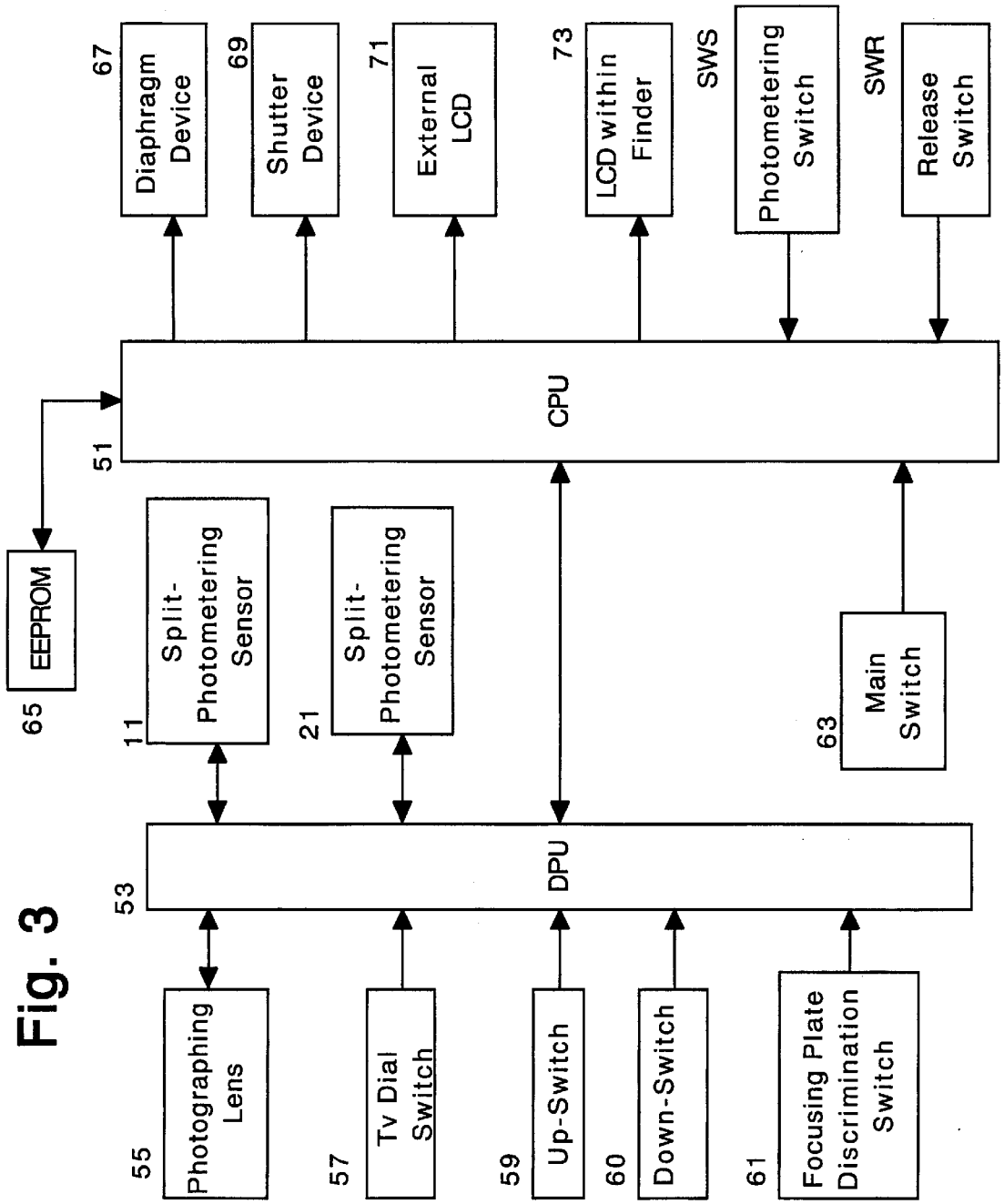
FIG. 3 is a block diagram of the circuitry of a single lens reflex camera shown in FIG. 1.

FIG. 3 shows the principal components of a control circuit of a camera constructed as above. In the illustrated embodiment, the control device includes a control CPU 51 which generally controls the whole operation of the camera; and a DPU 53 which communicates with the photographing lens, or deals with the input of the various switches.

Connected to the DPU 53 is the photographing lens 55, a Tv dial switch (shutter speed manually setting switch) 57, up-switch 59 and down-switch 60 which are actuated to select photometering modes or set a correction value, a discrimination switch 61 which is adapted to discriminate the type of focusing plate is mounted to the camera, and split photodetectors 11 and 21.

Connected to the CPU 51 is an EEPROM 65 which stores therein data on the photometering modes and the exposure correction value, etc., in accordance with the type of focusing plate being utilized; a switch device including a main switch 63 which is adapted to control the ON/OFF operation of the power source; a photometering switch SWS and a release switch SWR; and a memory including an EEPROM 65 which stores photometering modes therein. Also, connected to the CPU 51 is a diaphragm device 67 and a shutter device 69 which constitute the main function of the camera, an external LCD 71 which indicates the photographing data such as the shutter speed, and an internal LCD 73 within the finder.

While the CPU 51 and the DPU 53 communicate with each other, the state of the discrimination switch 61 is checked, the type of focusing plate 33 being utilized is checked, and the split photodetectors 11 and 21 receive measurement signals supplied from the split detection areas 13A through 13F and 23A through 23F to calculate the object brightness. The CPU 51 constitutes a control device; the CPU 51, the DPU 53, and the discrimination switch 61 constitute a discrimination device.

The correction values and the restriction on the selection of the photometering modes, depending on the type of focusing plate 33 being utilized, are shown in Tables 1 and 2 below, as an example. In the examples shown in Tables 1 and 2, the focusing plates 33 are classified into eight types represented by 3-bit data. The measurement correction includes level correction (Ev), correction of the minimum diaphragm value Avmin, and correction of the position of the exit pupil. The photometering modes include: a split-photometering mode in which split detection areas 13A through 13F and 23A through 23F are selectively used to detect backlight and correct the measurement; a center-weighted photometering mode in which all the detection areas 13A through 13F and 23A through 23F are used, however, the weight is placed on the detection areas near the center portion; and a spot beam photometering mode in which only the center detection area 13A or 23A is used. In Table 2, "○" indicates that any specific photometering mode can be selected; "Δ" indicates that the specific photometering mode can be selected but it is necessary to modify either: the algorithm for the calculation of the object brightness, the weight, or the split photodetector to be used; and "X" represents that the setting of the photometering mode is not permitted.

TABLE 1

| Type of Focusing Plate | Code | Photometering Correction | | |
|---|---|---|---|---|
| | | Level (Ev) | Av min (a) | Exit Pupil (A3') |
| Whole Surface-Mat Standard Standard Fresnel | 000 | 0.0 | 0.0 | 0.0 |
| Whole Surface-Mat for Telephoto Standard Fresnel | 001 | 0.5 | 0.1 | 16.0 |
| Microprism Mat Standard Fresnel | 010 | −0.2 | −0.2 | 0.0 |
| Split Image Mat Standard Fresnel | 011 | −0.3 | −0.3 | 0.0 |
| Whole Surface-Mat Standard Telephoto Fresnel | 100 | 0.2 | 0.0 | 8.0 |
| Whole Surface-Mat for Telephoto Telephoto Fresnel | 101 | 0.7 | 0.1 | 32.0 |
| Microprism Mat Telephoto Fresnel | 110 | −0.2 | −0.2 | 8.0 |
| Split Image Mat Telephoto Fresnel | 111 | −0.3 | −0.3 | 8.0 |

TABLE 2

| Type of Focusing Plate | Code | Photometering Mode | | |
|---|---|---|---|---|
| | | Split | Center-Weight | Spot |
| Whole Surface-Mat Standard Standard Fresnel | 000 | ○ | ○ | ○ |
| Whole Surface-Mat for Telephoto Standard Fresnel | 001 | ○ | ○ | ○ |
| Microprism Mat Standard Fresnel | 010 | Δ | Δ | Δ(X) |
| Split Image Mat Standard Fresnel | 011 | Δ | Δ | X |

TABLE 2-continued

| Type of Focusing Plate | Code | Photometering Mode | | |
|---|---|---|---|---|
| | | Split | Center-Weight | Spot |
| Whole Surface-Mat Standard Telephoto Fresnel | 100 | ○ | ○ | ○ |
| Whole Surface-Mat for telephoto Telephoto Fresnel | 101 | ○ | ○ | ○ |
| Microprism Mat Telephoto Fresnel | 110 | Δ | Δ | Δ(X) |
| Split Image Mat Telephoto Fresnel | 111 | Δ | Δ | X |

Figure 4:
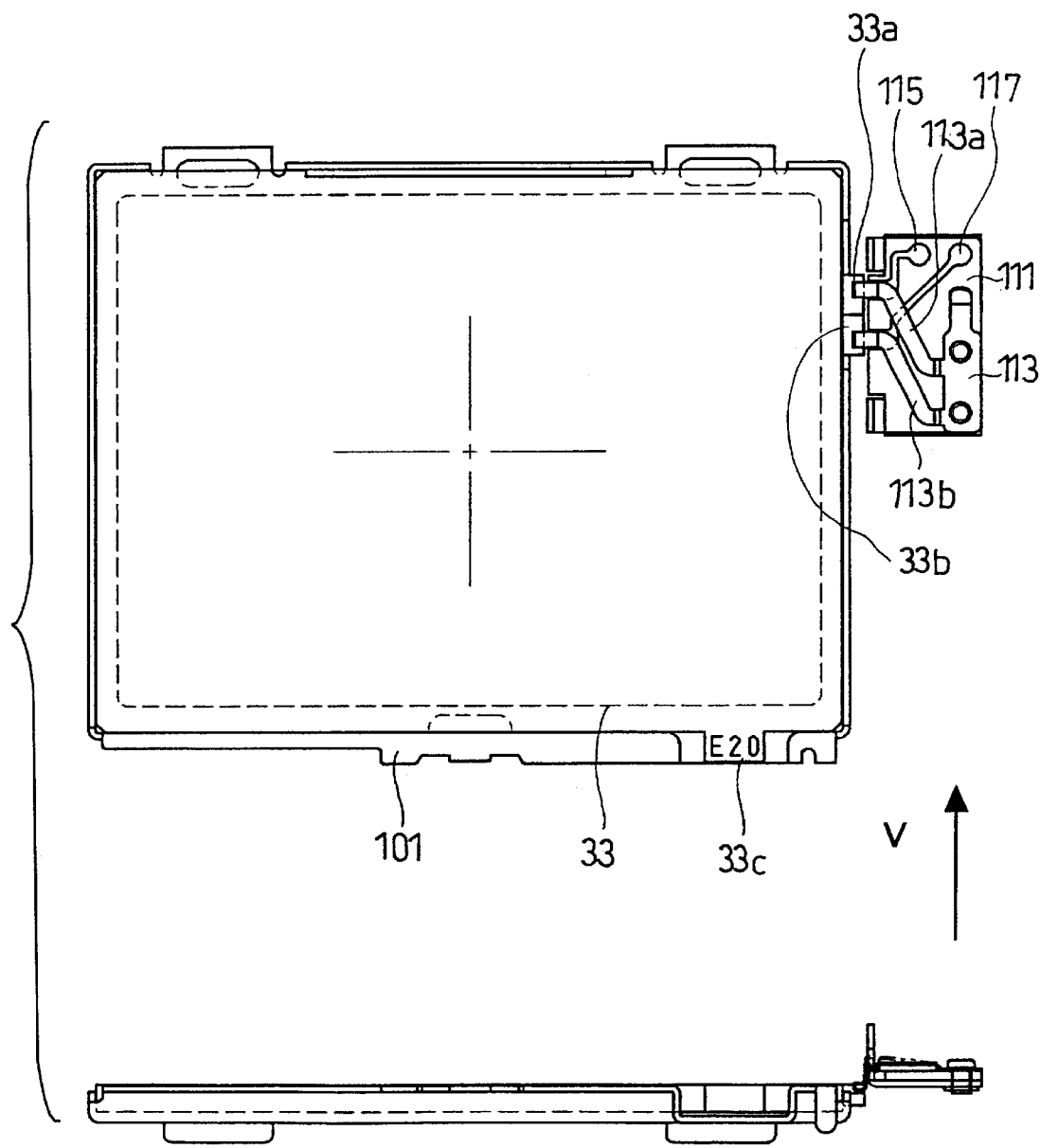
FIG. 4 is a plan and end elevation of a main part of a focusing plate discriminator device in a single lens reflex camera shown in FIG. 1.
Figure 5:
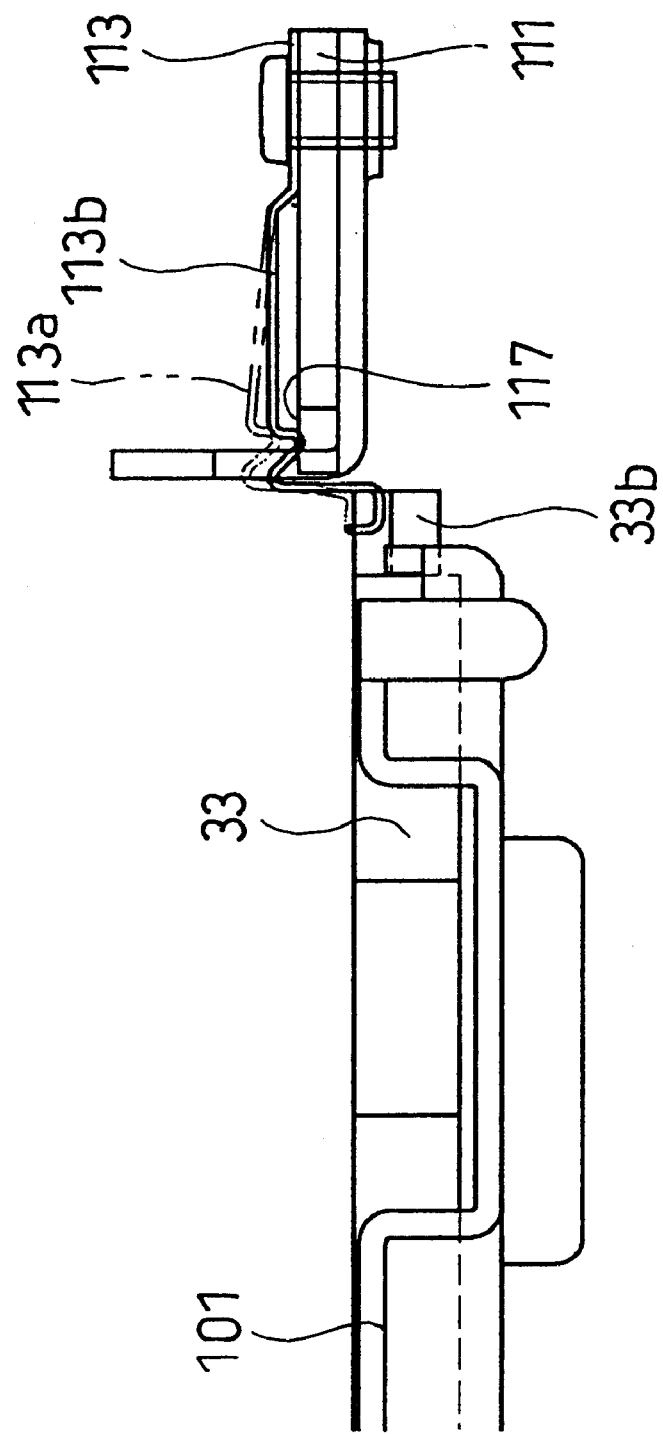
FIG. 5 shows part of an enlarged end view of a focusing plate discriminator device, viewed from the direction indicated by an arrow V in FIG. 4.

○: No Change
Δ: Algorithm Change/Weight Change/Sensor Change
X: Setting Not Permitted An embodiment of the focusing plate holding and discrimination device will be discussed below with reference to FIGS. 4 and 5. Although the focusing plates 33 are discriminated by the 3-bit data in Tables 1 and 2, the focusing plates are discriminated by 2-bit data in an embodiment shown in FIGS. 4 and 5.

The focusing plate 33 is held by a focusing plate seat (holder frame) 101 whose peripheral edge is in the form of a picture frame and is pressed against a mirror box (not shown). The holder frame 101 is rotatable about the major side thereof adjacent to the film surface. The focusing plate 33 can be detachably attached at a detachable position by moving the front end (free end) of the holder frame up and down, and is held in the position shown in FIG. 1 at a fixed position.

The focusing plate 33 is provided on one edge thereof (minor side) with two discrimination projections 33a and 33b (discrimination members), which are adapted to discriminate the type of focusing plates 33; and on the front end (major side) thereof a holding projection 33c is provided, which is held upon attachment or detachment. The discrimination projections 33a and 33b can discriminate four types of focusing plates 33 in accordance with the combination of the thickness of thereof. The camera body is provided with spring contacts 113a and 113b as a focusing plate discrimination device, which abut against the discrimination projections 33a and 33b of the focusing plate 33 held in a fixed position to detect the thickness or position thereof. The spring contacts 113a and 113b are formed by cutting and bending a conductor piece 113 secured to a support plate 111 to be brought into elastic press contact with the support plate 111 at the free ends of the spring contacts 113a and 113b, whereby the spring contacts 113a and 113b are electrically connected to the conductor piece 113. The support plate 111 is secured to the camera body and the conductor piece 113 is grounded.

Fixed contacts 115 and 117 are always in contact with the spring contacts 113a and 113b, between the spring contacts 113a, 113b and the support plate 111. The spring contacts 113a and 113b are pressed by the discrimination projections 33a and 33b when the focusing plate 33 is held in the fixed position, whereby the spring contacts 113a and 113b are moved away from the fixed contacts 115 and 117, respectively, and are in a free state (floating state). The fixed contacts 115 and 117 are connected to the switch input port of the DPU 53. The DPU 53 checks the level of the fixed contacts 115 and 117 to thereby discriminate the type of focusing plate 33 mounted.

Although, for clarity, four types of focusing plates 33 which can be discriminated are illustrated, the number of focusing plates to be discriminated is not limited thereto, and can be two or eight or more.

In a camera according to the illustrated embodiment, the type of focusing plate is discriminated, whereby the photometering correction value, the photometering mode, and the split-photometering algorithm can be modified in accordance with the type of focusing plate 33 thus detected. The measurement correction value can be modified in accordance with the focal length, the position of the exit pupil, the open f-number, or the vignetting factor; wherein the measurement correction level is modified uniformly. The modification of the photometering mode includes the restriction of the photometering mode or prohibition of spot beam photometering. The modification of the split-photometering algorithm includes a modification of the weighting value of the split detection areas.

The photometering operation will be discussed below with reference to FIGS. 6 through 15. The photometering modes include: a spot beam photometering mode in which only the center split detection areas 13A and 23A are used; a center-weighted photometering mode in which all the split detection areas 13A through 13F and 23A through 23F are used, the center detection areas 13A and 23A being weighted; and a split-photometering mode in which all the split detection areas are selectively used to detect backlight to thereby carry out the correction. The photometering mode is selected by the DPU 53 in response to the operation of the photometering mode switch by the user (photographer). In the illustrated embodiment, the restriction depending on the mounted focusing plate is carried out upon selection of the photometering mode, and thereafter, the correction of the measurement or the modification of the weighting value of the split-photometering algorithm are carried out in accordance with the characteristics of the focusing plate.

Figure 6:
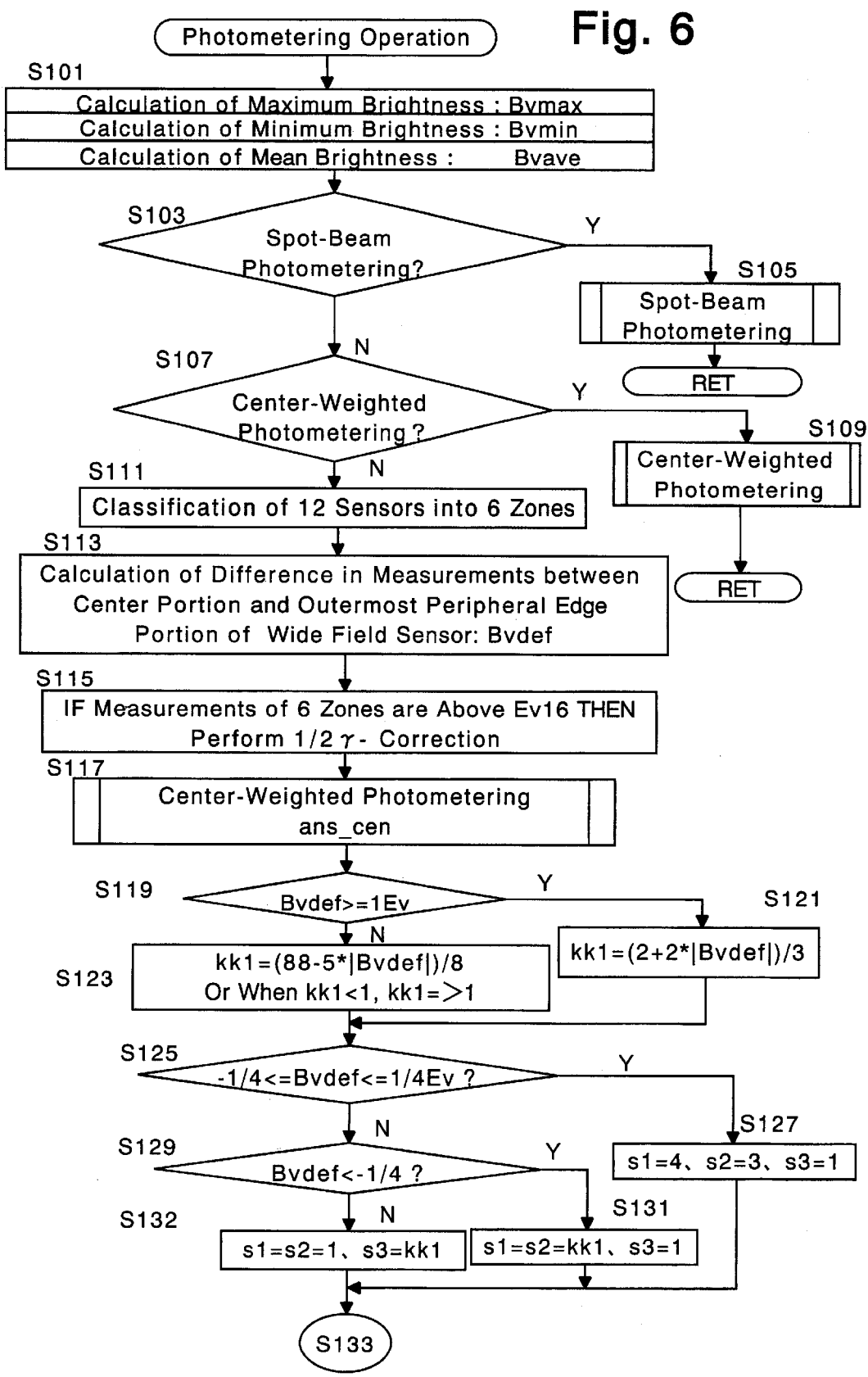
FIGS. 6, 7A and 7b are flow charts of a photometering operation in a single lens reflex camera to which the present invention is applied, by way of example.
Figure 7A:
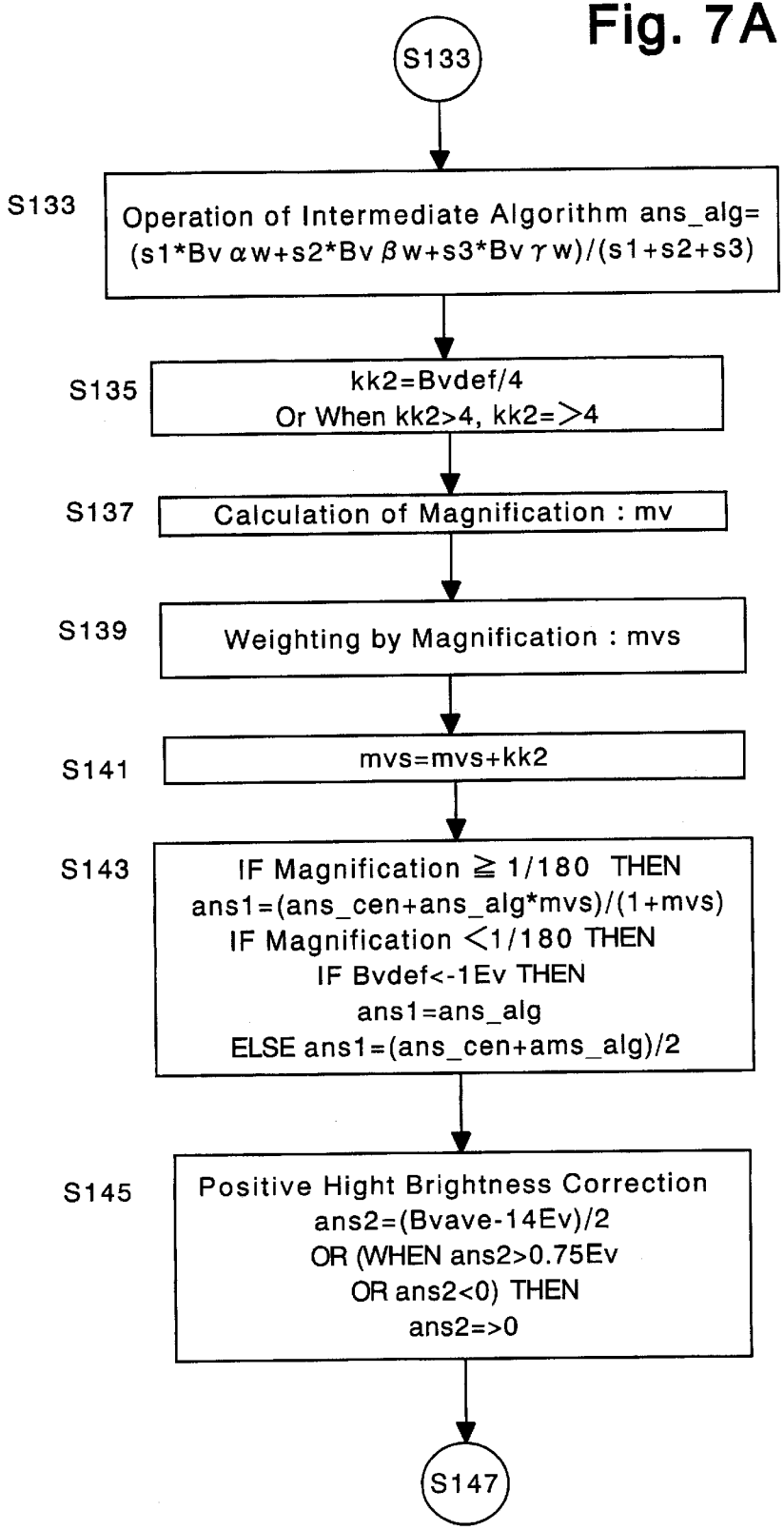
Figure 7B:
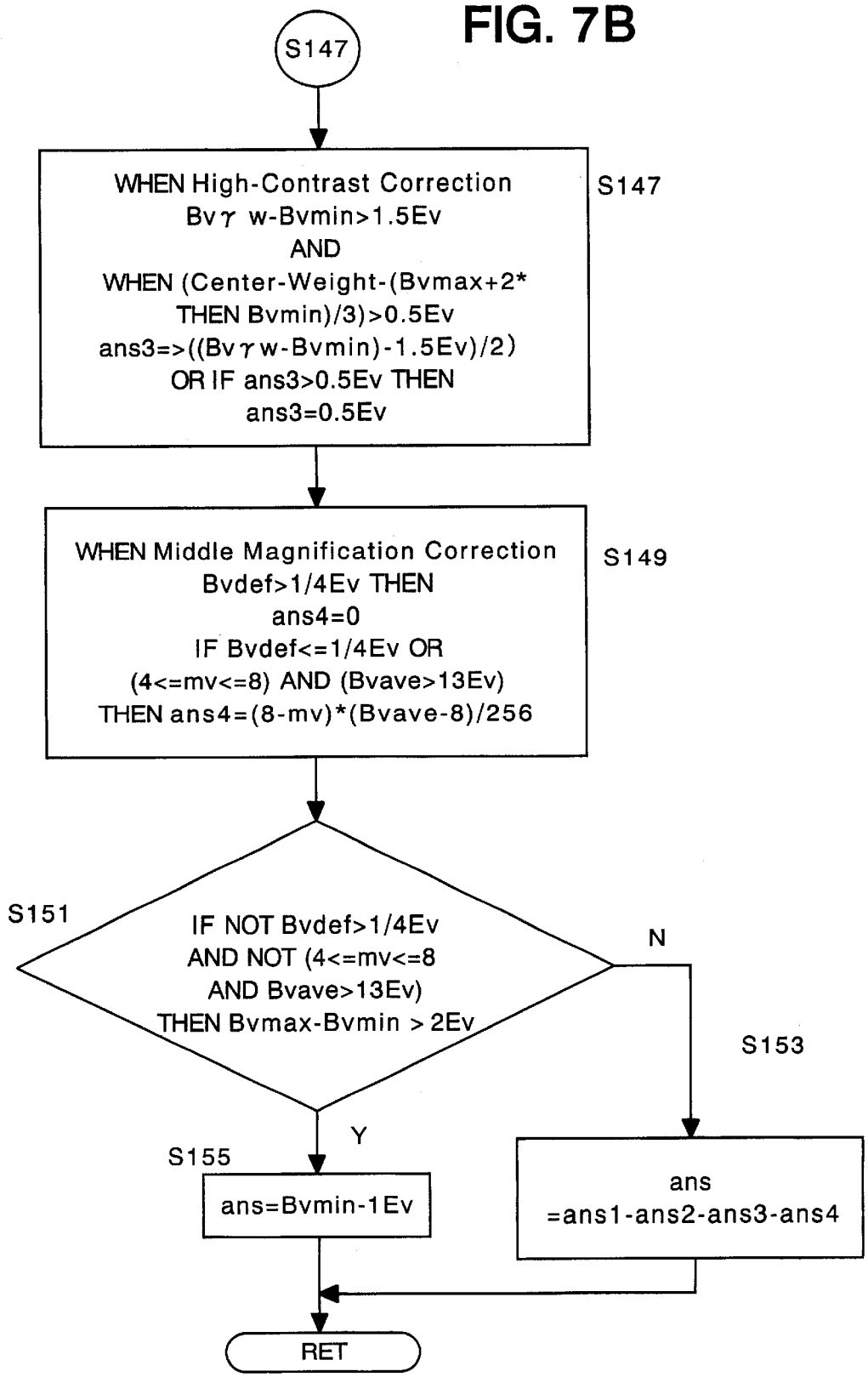

FIGS. 6, 7A and 7B show flow charts of the photometering operation and the split-photometering operation, according to the present invention, by way of example. The control enters the routine shown in FIGS. 6 and 7 when the photometering switch SWS is turned ON. In this routine, the maximum photometering value (maximum brightness) Bvmax and the minimum photometering value (minimum brightness) Bvmin and the average brightness value Bvave are calculated in accordance with the measurements of all the split photodetectors (S101). A check is executed to determine whether the spot beam photometering mode or the center-weighted photometering mode has been selected. If the spot beam photometering mode is selected, the spot beam photometering operation is carried out and thereafter the control is returned (S103, Y; S105). If the center-weighted photometering mode is selected, the center-weighted photometering operation is carried out, and thereafter the control is returned (S103, N; S107, Y; S109). If neither the spot beam photometering mode nor the center-weighted photometering mode is selected, the mode is considered to be the split-photometering mode in the illustrated embodiment; and hence, the split photographing operation beginning at step S111 is carried out (S103, N; S107, N; S111 through S155).

In the split-photometering operation, the 12 split detection areas are grouped into 6 zones (S111). In the illustrated embodiment, the detection area of the narrow field sensor 11 is divided into the following zones: the center detection zone (area) 13A, right and left detection zones (areas) 13B and 13C, upper and lower detection zones (areas) 13D and 13E, and the peripheral detection zone (area) 13F. Likewise, the detection area of the wide field sensor 21 is divided into the following zones: the center detection zone (area) 23A, right and left detection zones (areas) 23B and 23C, upper and lower detection zones (areas) 23D and 23E, and the peripheral detection zone (area) 23F. The size (surface area) of the detection sections increases in the order from the center detection zone 13A, the center detection section 23A, right and left detection zones 13B and 13C, upper and lower detection zones 13D and 13E, right and left detection zones 23B and 23C, upper and lower detection zones 23D and 23E, the peripheral detection zone 13F, and the peripheral detection zone 23F).

It is assumed that the measurements of the detection areas 13A through 13F of the narrow field sensor are An, B1n, B2n, C1n, C2n, Dn, respectively; and that the measurements of the detection areas 23A through 23F of the wide field sensor are Aw, B1w, B2w, C1w, C2w, Dw. respectively. Also, it is assumed that: Bv$\alpha$n is the measurement of the narrow field center detection area An; Bv $\beta$n is the measurement of the narrow field intermediate detection areas (B1n+B2n+C1n+C2n)/4; Bv$\gamma$n is the measurement of the narrow field peripheral detection area Dn; Bv$\alpha$w is the measurement of the wide field center detection area Aw; Bv$\beta$w is the measurement of the wide field intermediate detection areas (B1w+B2w+C1w+C2w)/4; Bv$\gamma$w is the measurement of the wide field peripheral detection area Dw; wherein "$\alpha$" represents the center area, "$\beta$" represents the intermediate area surrounding the center area $\alpha$, and "$\gamma$" represents the peripheral area surrounding the intermediate areas $\beta$.

Thereafter, the difference Bvdef in the measurement between the center detection area 13A and the peripheral detection area 13F, of the wide field sensor 21, is calculated (S113). if the measurements of the six detection zones is above 16Ev, a ½$\gamma$ correction is performed (S115). Thereafter, the center-weighted photometering operation similar to that at step S109 is carried out to obtain the center-weighted measurement ans-cen (S117).

A check is executed to determine whether the difference Bvdef is larger than 1 Ev; i.e., whether there is backlight to obtain a first correction value kk1 (S119, S121, S123). In case of backlight, kk1=2+2 * |Bvdef|/3; and in case of no backlight, kk1=88−5 * |Bvdef|/8.

Thereafter, a check is executed to determine whether the difference Bvdef is greater than −¼ Ev and less than ¼ Ev. If the difference Bvdef is greater than −¼ Ev and less than ¼ Ev, the coefficients s1, s2 and s3 are set to s1=4, s2=3 and s3=1 (S125, Y; S127). If the difference Bvdet is less than −¼ Ev, the coefficients s1, s2 and s3 are set to s1=s2=kk1, and s3=1 (S125, N; S129, Y; S131). If the difference Bvdef is not less than −¼ Ev, the coefficients s1, s2 and s3 are set to s1=s2=1, and s3=kk1 (S125, N; S129, N; S132). To simplify the subsequent calculations, an intermediate algorithm calculation is carried out to obtain an intermediate measurement ans-alg (S133), whereby a second correction value kk2 can be obtained by kk2=Bvdef/4 (S135).

The magnification mv is calculated in accordance with the focal length and the object distance, input from the photographing lens (S137), and thereafter, the weighting value mvs corresponding to the magnification mv is calculated (S139). Thereafter, the second correction value kk2 is added to the weighting value mvs (S141). Magnification mv is calculated via the following equation: mv=$\log_2$ (Dis./f); wherein Dis. represents the distance from the object to be photographed (m), and f represents the focal length (m). For example, if the magnification is greater than 2.125 (1/4.5), mvs=0; greater than 2.125 (1/4.5) and less than 4.125 (1/18), mvs=(mv−9)/8; greater than 4.125 (1/18) and less than 6.125

(1/70), mvs=(57−mv)/8; greater than 6.125 (1/70), mvs=1. The second correction value kk2 is added to the weighting value mvs (S141). A more detailed explanation of the calculation of the weighting value mvs will be described in the following:

1.) IF mv<2.125
   mvs=0; kk2=0.
2.) IF 2.125≦mv≦4.125
   mvs=(mv−1.125)/1
   kk2=|Bvdef|/4; wherein:
      WHEN kk2>4
         according to step S135; kk2=4.
3.) IF 4.125<mv≦6.125
   mvs=(0.75−mv)/1
   kk2=|Bvdef|/4; wherein:
      WHEN kk2>4
         according to step S135: kk2=4.
4.) IF mv>6.125
   mvs=1; kk2=0.

The first photometering value ans1 is calculated in accordance with the photometering value and the weighting value thus obtained (S143). Moreover, the a positive correction value ans2 at a high intensity, a high contrast correction value ans3 at a high contrast, and an intermediate magnification correction value ans4 are calculated (S145, S147, S149).

In the case of backlight, a magnification other than an intermediate magnification, or if the brightness is not high, the photometering value ans is obtained by the expression (ans=Bvmin−1Ev) (S151,Y; S155). In case of the absence of backlight, an intermediate magnification, or high brightness, the photometering value ans is obtained by the expression (ans=ans1−ans2−ans3−ans4) (S151, N; S153).

Thus, the photometering value ans at the split-photometering mode can be obtained. Furthermore, the photometering value ans is used as object brightness data in the exposure calculation to determine the shutter speed Tv or the diaphragm value Av.

Figure 9:
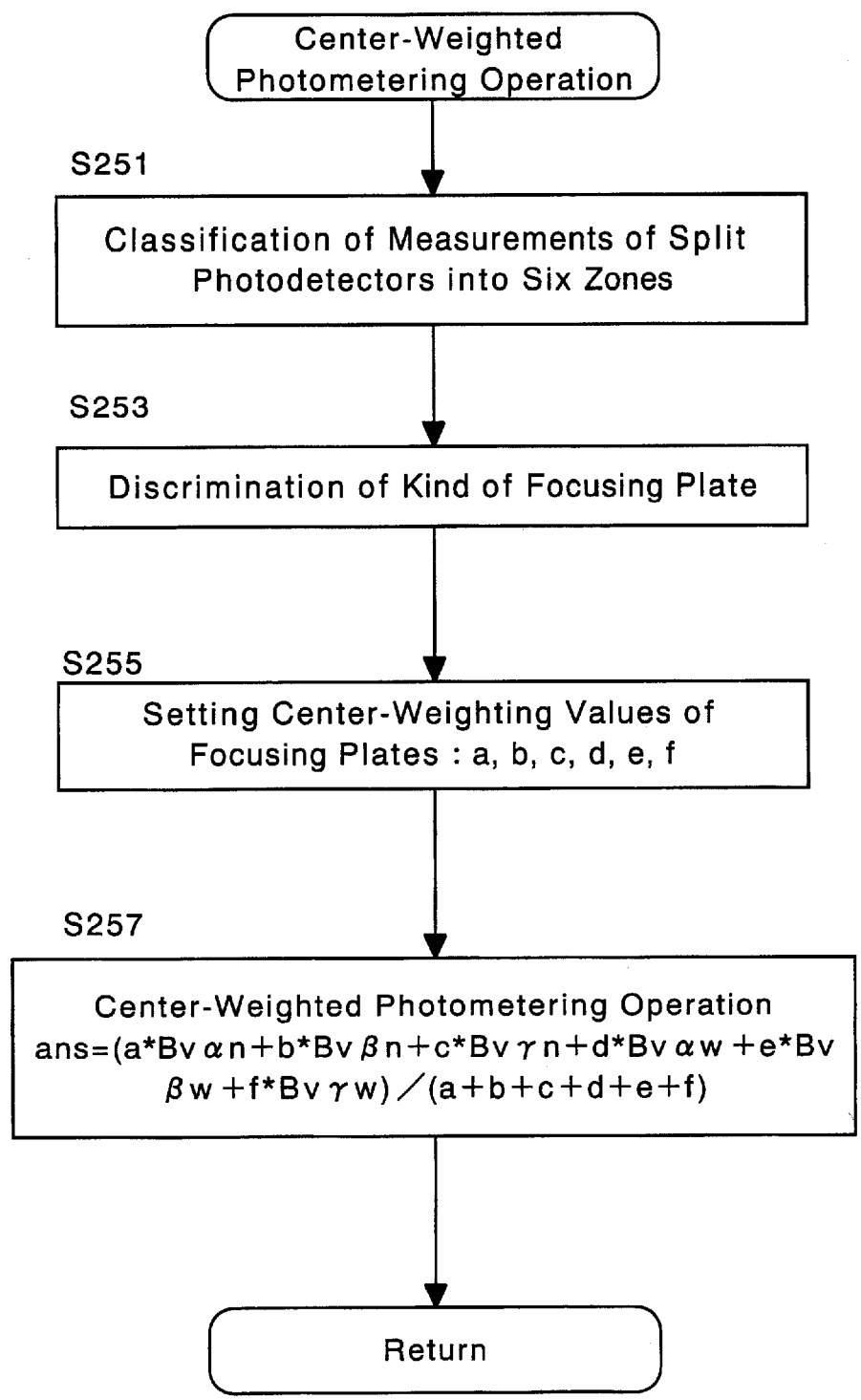
FIG. 9 is a flow chart of a center-weighted photometering operation in a single lens reflex camera to which the present invention is applied, by way of example.
Figure 10:
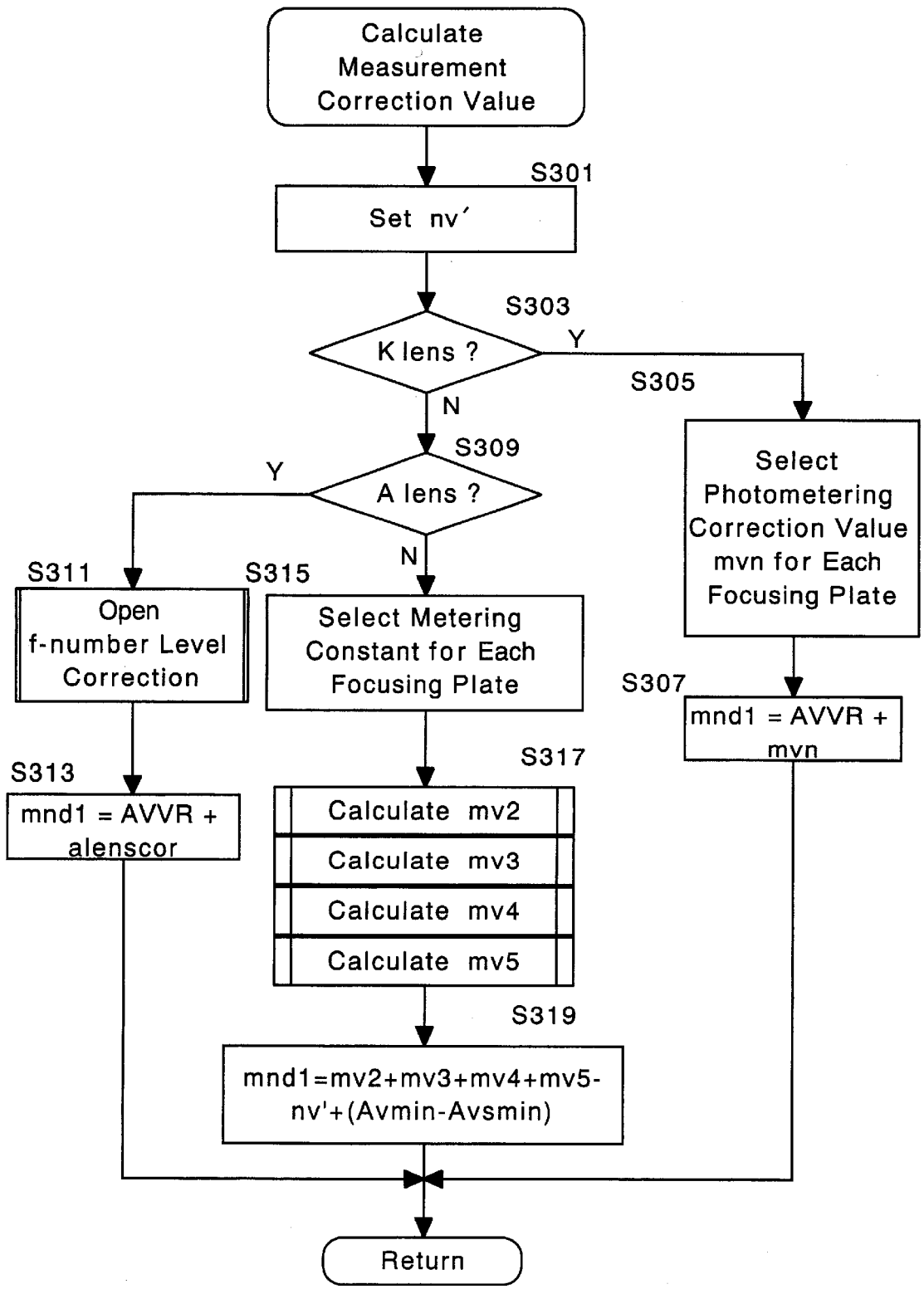
FIG. 10 is a flow chart of a measurement correcting operation in a single lens reflex camera to which the present invention is applied, by way of example.
Figure 13:
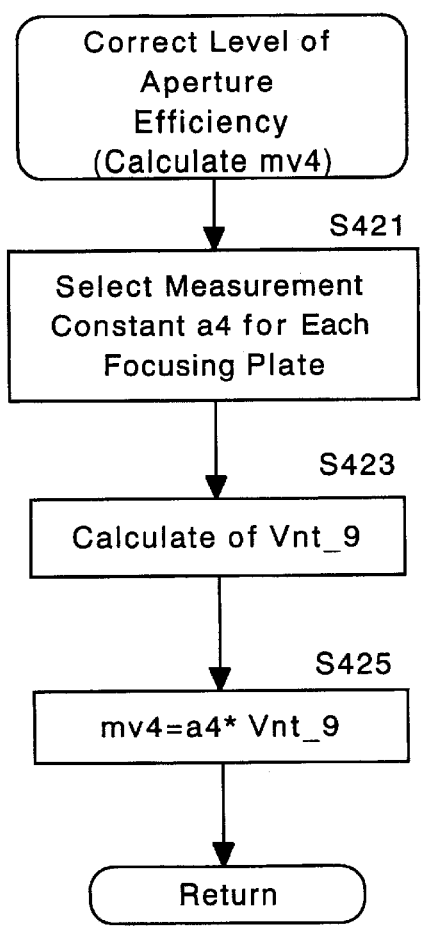
FIG. 13 is a flow chart of a correcting operation for the vignetting factor level in a single lens reflex camera to which the present invention is applied, by way of example.

The center-weighted photometering operation at S109 will be discussed below with reference to the flow chart shown in FIG. 9. In the center-weighted photometering operation, all the detection areas of the first and second split sensors 11 and 21 are used and the measurement of each detection area is weighted in accordance with the characteristics of the focusing plate being utilized.

In the center-weighted photometering operation, 12 measurements of the pair of split photo sensors are grouped into 6 zones (S251). The type of focusing plate is discriminated and the weighting values a, b, c, d, e and f for the measurements of each zone are selected in accordance with the discriminated focusing plate (S253, S255). The weighting values a, b, c, d, e and f are preset corresponding to the type of focusing plate, and are written in the EEPROM 57.

Thereafter, the photometering value ans is calculated; for example, by the following formula using the weighting values a, b, c, d, e and f (S257): ans=(a * Bvαn+b * Bvβn+c * Bvγn+d * Bvαw+e * Bvβw+f * Bvγw)/(a+b+c+d+e+f).

Figure 8:
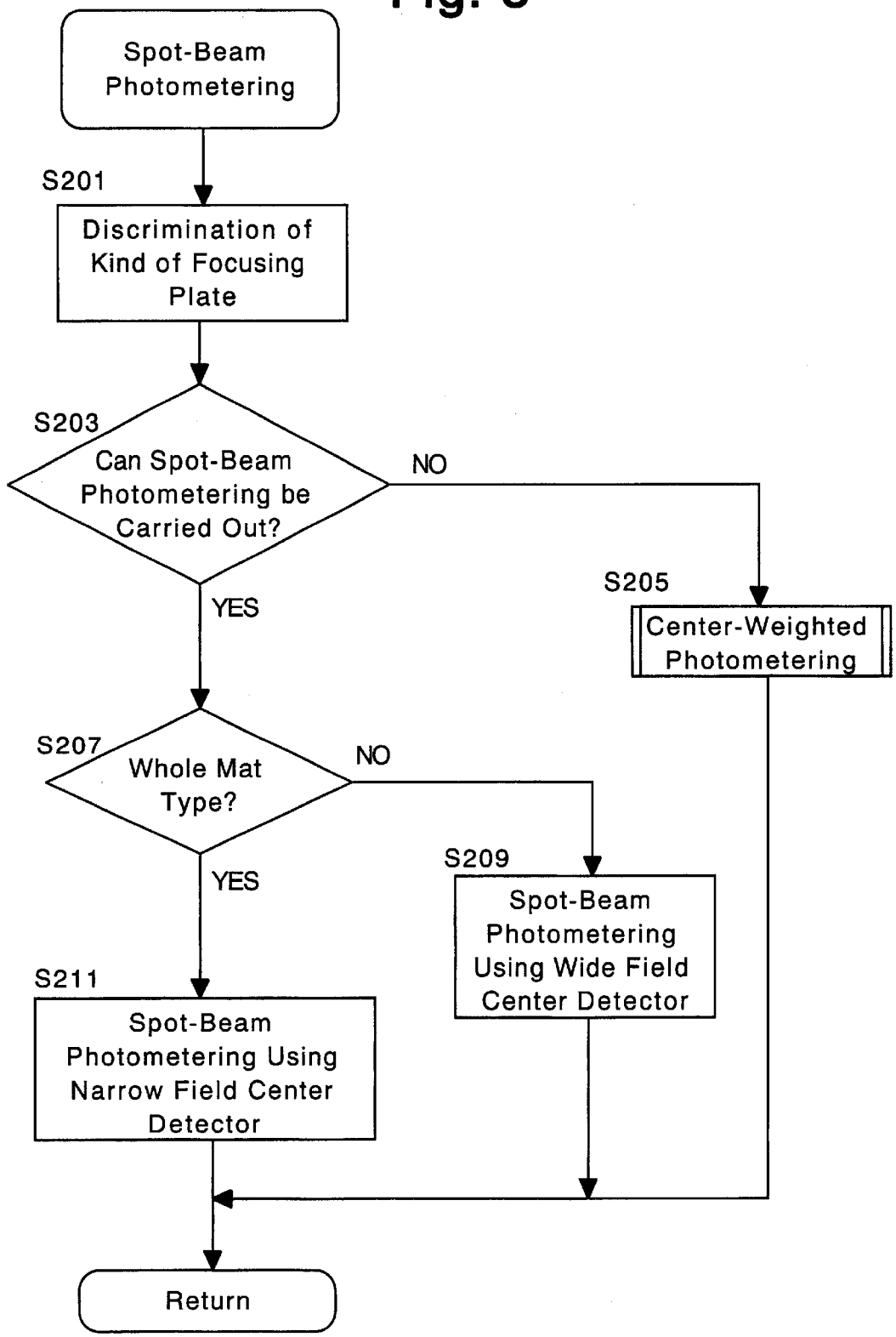
FIG. 8 is a flow chart of a spot beam photometering operation in a single lens reflex camera to which the present invention is applied, by way of example.

The spot beam photometering operation at step S105 will be discussed below with reference to the flow chart shown in FIG. 8.

In the spot beam photometering operation, the type of focusing plate utilized is discriminated, whereby narrow field center sensor spot photometering, wide field center sensor spot photometering, or center-weighted photometering is selected in accordance with the characteristics of the discriminated focusing plate.

First, the type of focusing plate is discriminated. Thereafter, a check is executed to determine whether the spot beam photometering can be carried out and whether the focusing plate is a whole mat (S201, S203, S207). If spot beam photometering cannot be carried out for the focusing plate, the center-weighted photometering operation which is closest to the spot beam photometering in the photometering algorithms is carried out, and thereafter the control is returned (S203, N; S205). If the spot beam photometering can be carried out for the focusing plate, a check is executed to determine whether or not the focusing plate is a whole mat type. If the focusing plate is not a whole mat type, spot beam photometering is carried out using the wide field center detection area 23A (S203, Y; S207, N; S209). Also, if the focusing plate is not a whole mate type, in order to reduce the influence of the photometering error due to the prism, the wide field center detection area 23A is utilized (S203, Y; S207, Y; S211).

The following discussion will be addressed to the measurement correction operation (with reference to the flow charts shown in FIG. 10 and FIGS. 11 through 15) to correct the photometrical measurement in accordance with the type of focusing plate, the weighting operation to weight the measurement of each split photodetector in accordance with the type of focusing plate, the focal length, the vignetting factor, the position of the exit pupil, and the open f-number.

The measurement correction is carried out for the measurement input from the split photodetectors 11 and 21. The measurement correction is usually carried out prior to the spot beam photometering operation, the center-weighted photometering operation or the split photometering operation. However, the timing of the measurement correction operation can be optionally selected.

In the measurement correction operation, the amount of image illuminance correction nv' is set (S301). The image illuminance correction nv' represents a correction value for the depletion of peripheral light; the value of which is read from the ROM within the photographic lens. Thereafter, a check is made to determine whether the photographic lens is a K lens or an A lens (S303, S309).

The K lens is a lens which transmits photometering correction information as diaphragm value information AVVR to the camera body when photometering is carried out through the lens with the aperture open. If the X lens is being utilized (S303, Y), a photometering correction value for the focusing plate mvn is selected, and correction value mnd1 is calculated according to the following equation: mnd1=AVVR +mvn (S305, S307).

The A lens is a lens which has information on open aperture values Avmin which includes photometering correction information of the K lens AVVR (open aperture f-number). If the A lens is being utilized (S309, Y), the open aperture f-number correction value alenscor is calculated according to the open aperture f-number correction operation, and differing depending on the focusing plate being utilized; wherein correction value mnd1 according to the photometering correction information AVVR is obtained by the following equation: mnd1=AVVR+alenscor (S311, S313).

If neither the K lens nor the A lens is utilized; namely, if the lens is a photographic lens including a ROM within the lens having fixed lens-information (open aperture f-number, focal length, vignetting, exit pupil); the focusing plate photometering constant selection operation is carried out (S303, S403, S411, S421, S431), and the focusing plate correction operation is carried out to calculate correction values mv2, mv3, mv4 and mv5. Thereafter, the correction value mnd1 is obtained by the following equation (S303, N; S309, N; S315; S319): mnd1=mv2+mv3+mv4+mv5−nv'+

(Avmin−Avsmin). In the focusing plate photometering constant selection operation, the focusing plate is discriminated, and photometering correction value data like that of Table 1 is obtained from the ROM of the camera.

The operations at S305 and S307 are repeatedly carried out for the 12 split detection areas 13A through 13F and 23A through 23F. Accordingly, a relatively precise photometering correction value can be calculated.

The correction value mnd1 thus obtained is used as a correction value of the measurements of the detection areas 13A through 13F and 23A through 23F.

Figure 14:
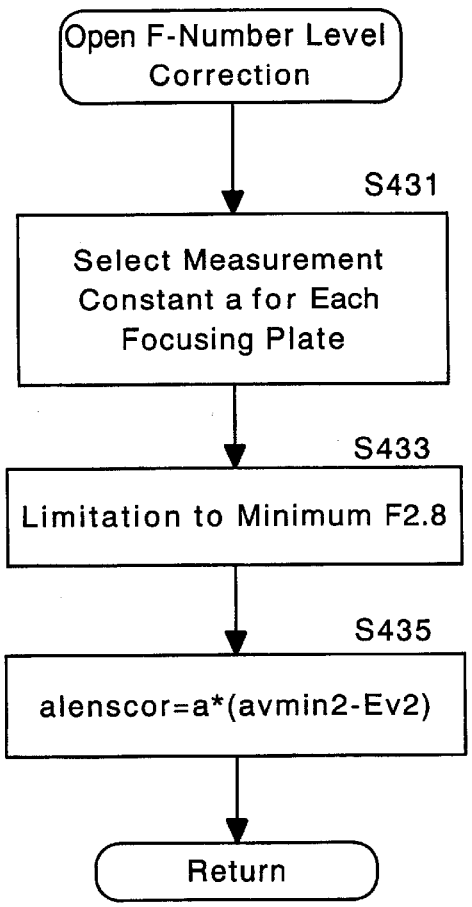
FIG. 14 is a flow chart of a correcting operation for the open f-number level in a single lens reflex camera to which the present invention is applied, by way of example.
Figure 15:
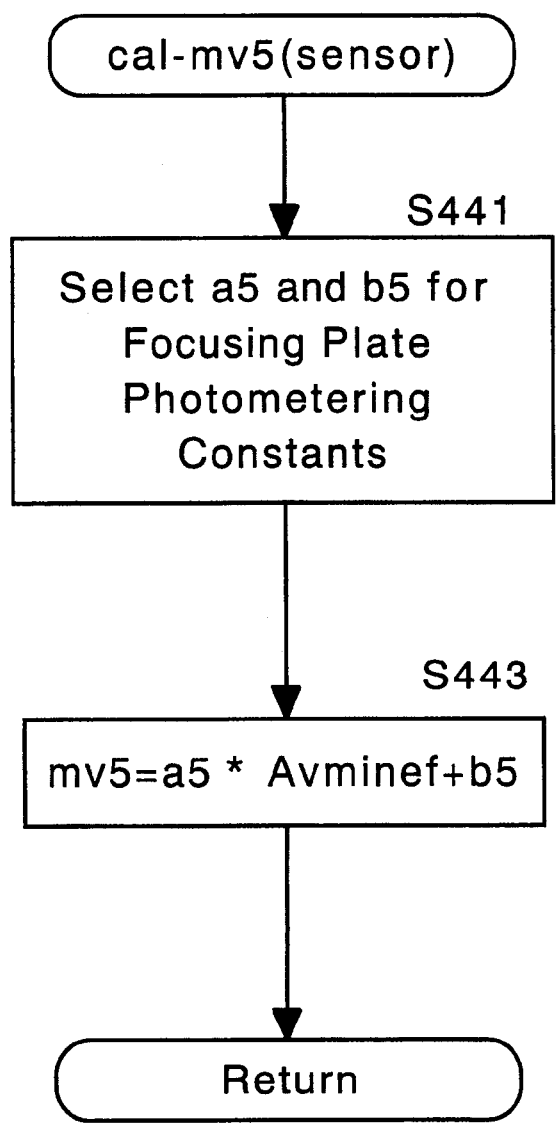
FIG. 15 is a flow chart of a correcting operation for the measurement error in a single lens reflex camera to which the present invention is applied, by way of example.
Figure 16:
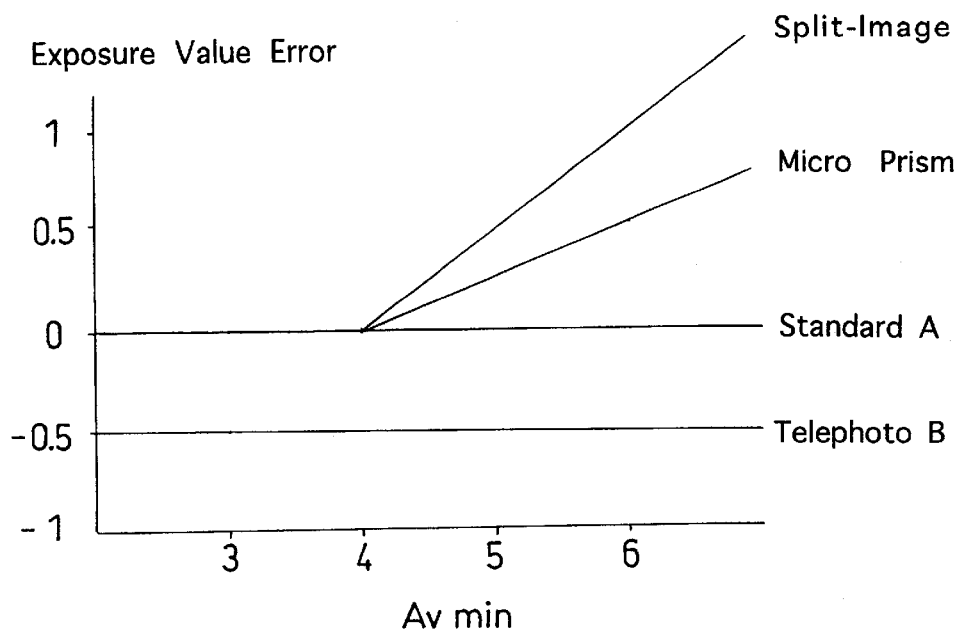
FIG. 16 is a graph showing a relationship between the minimum diaphragm value (open diaphragm value) Avmin of a photographing lens and an exposure error, depending on the characteristics of the focusing plate used, which changes as the minimum diaphragm value changes.
Figure 17:
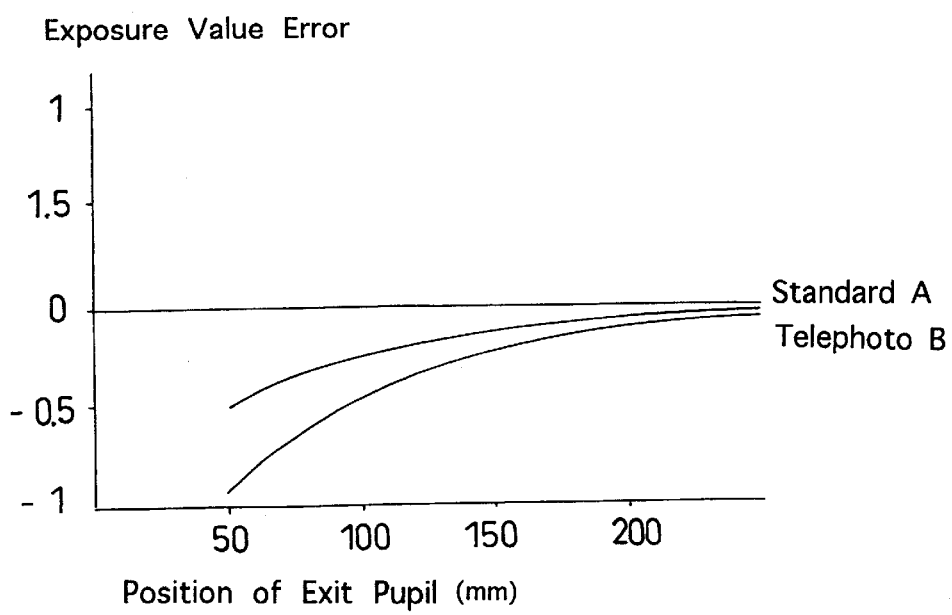
FIG. 17 is a graph showing an exposure error caused in accordance with the characteristics of the focusing plate, when the position of the exit pupil changes.

Furthermore, although the constants such as focusing plate photometering constant selection (S315), constant 'a' of FIG. 14 (S431), constant a3' of FIG. 12 (S411) are not included in Table 1; information including constants other than level (Ev), Avmin (a), and the exit pupil (a3') of Table 1 can be retrieved from the ROM of the camera.

The following discussion will be directed to the calculation of the correction value at step S305, with reference to the flow charts shown in FIGS. 11 through 15.

<Level Correction at Each Focal Length>

This level correction is carried out to calculate the correction value mv2 which is used to correct a change in the incidence efficiency of light upon the split photodetectors depending on the focal length.

In this operation, the correction value mv2 is set to be an initial value 0 (S401), and a2 is selected as the photometering constant (S403). The correction value m2 is obtained by the following equation: m2=a2/(focal length). Thereafter, the control is returned (S405).

<Correction of Position of Exit Pupil>

This operation is carried out to calculate the correction value mv3 which is used to correct the level fluctuation of the photometrical measurement in accordance with the characteristics of the focusing plate and the position of the exit pupil.

In this operation, a3' and a3' are selected in accordance with the type of focusing plate (S411). Consequently, mv3 can be obtained by the following equation: mv3=a3'* ((l/exp+(0 * 38−dv') * Δexp)−1/64) * (avminef−a3").

<Level Correction of the Vignetting factor>

This operation is carried out to calculate the correction value mv4 which is used to correct the photometrical measurement error, caused by a variation of the vignetting factor depending on the photographing lens and the characteristics of the focusing plate being utilized.

In this operation, a4 is selected, and Vnt_9 is calculated (S421, S423). Consequently, the vignetting factor correction value mv4 can be obtained by the following equation (S425): mv4=a4 * vnt_9.

Furthermore, vnt_9 is obtain according to the following equation:

$$vnt\_9=vnt\_9'-3/8; \text{ wherein:}$$

vnt_9'=represents information written in the lens ROM and is defined as:
vnt_9'−log2 (Vnt')+3/8; wherein:
Vnt' represents the vignetting factor for a image height of 9 mm; the constant 3/8 is required in order to avoid the calculation result being negative.

<cal_mv5 (sensor)>

This operation is carried out to calculate the correction value mv5 which is used to correct a measurement error, depending on the minimum diaphragm value Avmin and the type of focusing plate.

In this operation, the constants a5 and b5 are selected for focusing plate photometering constants (S441). Consequently, mv5 can be obtained by the following equation:

$$mv5=a5 * avminef+b5 \text{ (S443)}.$$

<Level Correction of open f-number>

This operation is carried out to calculate the correction value alenscor corresponding to the type of focusing plate and open f-number of the photographing lens.

In this operation, the focusing plate measurement constant "a" is selected (S431). The limit on avmin2 is put into effect at the open f-number of F2.8. Consequently, the correction value alenscor can be obtained by the following equation (S433, S435): alenscor=a * (avmin2−Ev2).

As can be understood from the foregoing, according to the present invention, the discrimination projections which are adapted to discriminate the type of focusing plates are provided on the detachable focusing plates, and the camera body is provided with a discrimination device which comes into contact with the discrimination projections to discriminate the type of focusing plates. The photometering correction value corresponding to the focusing plates and the data of the photometering modes are stored in the EEPROM. Consequently, the photometering correction value and the photometering mode can be selected in accordance with the type of attached focusing plate detected by the discrimination device. Therefore, it is possible to carry out an appropriate exposure without modification of the photometering mode or correction of the exposure value by the user (photographer) in accordance with the type of focusing plate. Consequently, ease of operability can be enhanced due to there being no need to modify the photometering mode nor correcting the exposure value.

Although the illustrated embodiment is applied to a single lens reflex camera having a pair of split photodetectors 11 and 12, the present invention can be applied to a camera having a single split photodetector. The structure of the split photodetector is not limited to that in the illustrated embodiment. In summary, in the present invention, the type of attached focusing plate is discriminated, and if a selected photometering mode is inappropriate for the focusing plate, the photometering mode is prohibited or the photometering mode is changed to meet with the focusing plate, or the photometering value, the coefficient or constant, etc., in the photometering calculation expression at the selected photometering mode are corrected.

As can be understood from the foregoing, according to the present invention, the type of attached focusing plate is discriminated and the photometering mode is selected or the measured brightness is corrected in accordance with the characteristics of the discriminated focusing plate. Consequently, not only can an appropriate exposure be obtained regardless of the type of focusing plate, but also the operation can be facilitated since it is not necessary for the user (photographer) to perform an additional or special operation for the appropriate exposure.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A photometering apparatus for a camera that mounts a plurality of types of photographing lenses and mounts a plurality of types of focusing plates, comprising:

a split photodetector that measures photometering values;

a discrimination device for discriminating a type of a mounted focusing plate;

a processing unit that determines a type of a mounted photographing lens;

at least one memory for storing:
- a predetermined number of said types of focusing plates and corresponding photometering correction constants for each type of focusing plate;
- a predetermined number of photometering modes for each type of focusing plate, including a spot beam photometering mode;
- permissible photometering modes for each type of focusing plate;

a calculation device that calculates measurement correction values according to each type of focusing plate stored in said memory, including
- a photometering correction value selector that selects a photometering correction value for the type of the mounted focusing plate when a first type of mounted photographing lens is determined;
- an open F-number level correction calculator that selects an open F-number level correction when a second type of mounted photographing lens is determined; and
- a weighting device for, when neither said first type nor said second type of mounted photographing lens is determined, weighting a photometering value measured by the split photodetector according to:
  - a focal length of the mounted photographing lens;
  - a position of an exit pupil of the mounted photographing lens;
  - a vignetting factor of the mounted photographing lens; and
  - a photometering error determined by a minimum diaphragm value of the type of the mounted photographing lens and the type of the mounted focusing plate; and a photometering selector for, when the spot beam photometering mode is selected, selecting, according to the type of said focusing plate, one of a narrow field center sensor spot photometering operation, a wide field center sensor spot photometering operation, and a center-weighted photometering operation.

2. The photometering apparatus according to claim 1, wherein said at least one memory is provided in the camera body.

3. A photometering apparatus for a camera that mounts a plurality of types of photographing lenses and mounts a plurality of types of focusing plates, comprising:

a photodetector assembly including at least one split photodetector that measures photometering values, said photodetector assembly including a narrow center detection area and a wide center detection area;

a discrimination device for discriminating a type of a mounted focusing plate;

at least one memory for storing photometering correction constants for each type of focusing plate and a predetermined number of photometering modes for each type of focusing plate, including a spot beam photometering mode;

a calculation device that calculates and applies measurement correction values according to the type of mounted focusing plate discriminated by said discrimination device; and a spot-beam photometering selector that, when the spot beam photometering mode is selected, selects a narrow field center detection area photometering operation using said narrow center detection area when a whole mat focusing plate is the mounted plate, and selects a wide field center detection area photometering operation using said wide center detection area when a microprism focusing plate is the mounted plate to reduce the influence of photometering error caused by the microprism.

4. The photometering apparatus according to claim 3, wherein said at least one memory is provided in the camera body.

5. A photometering apparatus for a camera that mounts a plurality of types of photographing lenses and mounts a plurality of types of focusing plates, comprising:

a split photodetector assembly including at least one split photodetector that measures photometering values, said photodetector assembly including a narrow center detection area and a wide center detection area;

a discrimination device for discriminating a type of a mounted focusing plate, including at least whether the mounted focusing plate is a whole mat focusing plate; and a spot-beam photometering selector that selects a narrow field center detection area photometering operation using said narrow center detection area when the mounted focusing plate is a whole mat focusing plate, and selects a wide field center detection area photometering operation using said wide center detection area when the mounted focusing plate is not a whole mat focusing plate to reduce the influence of photometering error caused by a center portion of the mounted focusing plate.

6. The photometering apparatus according to claim 5, wherein said split photodetector assembly includes a narrow split photodetector including said narrow center detection area and a wide split photodetector including said narrow split detection area.

7. The photometering apparatus according to claim 5, wherein said spot-beam photometering selector further selects a center-weighted photometering operation using both said narrow center detection area and said wide center detection area when the mounted focusing plate is a split image focusing plate.

8. The photometering apparatus according to claim 5, further comprising:

at least one memory for storing:
- a predetermined number of said types of focusing plates and corresponding photometering correction constants for each type of focusing plate;
- a predetermined number of photometering modes for each type of focusing plate;
- permissible photometering modes for each type of focusing plate;

a calculation device that calculates measurement correction values according to each type of focusing plate stored in said memory.

9. The photometering apparatus according to claim 8, further comprising:

a processing unit that determines a type of a mounted photographing lens, and wherein said calculation device includes:
- a photometering correction value selector that selects a photometering correction value for the type of the mounted focusing plate when a first type of mounted photographing lens is determined;
- an open F-number level correction calculator that selects an open F-number level correction when a second type of mounted photographing lens is determined; and a weighting device for, when neither said first type nor said second type of mounted photographing lens is determined, weighting a photometering value measured by the split photodetector assembly.

10. The photometering apparatus according to claim 9, wherein said weighting device weights said photometering value measured by the split photodetector assembly according to: a focal length of the mounted photographing lens; a position of an exit pupil of the mounted photographing lens; a vignetting factor of the mounted photographing lens; and a photometering error determined by a minimum diaphragm value of the type of the mounted photographing lens and the type of the mounted focusing plate.

11. The photometering apparatus according to claim 8, wherein said at least one memory is provided in the camera body.

* * * * *